(12) United States Patent
Engwall et al.

(10) Patent No.: US 7,897,004 B2
(45) Date of Patent: Mar. 1, 2011

(54) METHOD FOR FABRICATING STRINGERS

(75) Inventors: Dwight L. Engwall, Haysville, KS (US); Christopher J. Morrow, Wichita, KS (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 11/850,888

(22) Filed: Sep. 6, 2007

(65) Prior Publication Data
US 2008/0110563 A1 May 15, 2008

Related U.S. Application Data

(62) Division of application No. 10/830,291, filed on Apr. 20, 2004, now Pat. No. 7,293,737.

(51) Int. Cl.
*B29C 65/00* (2006.01)

(52) U.S. Cl. ............... 156/285; 156/381; 156/307.1; 156/307.7; 264/257; 264/258; 264/554; 264/516; 264/544; 264/552

(58) Field of Classification Search ............... 264/516, 264/544, 552, 554, 257, 258; 156/285, 286, 156/381, 382, 307.1, 307.7
See application file for complete search history.

(56) References Cited

U.S. PATENT DOCUMENTS

| 1,111,333 | A | 9/1914 | Voigt et al. |
| 1,133,592 | A | 3/1915 | Voigt et al. |
| 2,593,714 | A | 4/1952 | Robinson |
| 2,762,419 | A | 9/1956 | Prewitt |
| 3,220,910 | A | 11/1965 | Walkey |
| 3,456,893 | A | 7/1969 | Michelson |
| 4,067,757 | A | 1/1978 | Layman |
| 4,632,328 | A | 12/1986 | Bishop et al. |
| 4,633,632 | A | 1/1987 | Sarh |
| 4,717,330 | A | 1/1988 | Sarh |
| 4,738,816 | A | 4/1988 | Anderson |
| 4,822,272 | A | 4/1989 | Yanase et al. |
| 5,170,967 | A | 12/1992 | Hamamoto et al. |
| 5,223,067 | A | 6/1993 | Hamamoto et al. |
| 5,242,523 | A | 9/1993 | Willden et al. |
| 5,266,137 | A | 11/1993 | Hollingsworth |
| 5,368,807 | A | 11/1994 | Lindsay |
| 5,387,098 | A * | 2/1995 | Willden ................ 425/393 |
| 5,538,589 | A | 7/1996 | Jensen et al. |
| 6,502,788 | B2 | 1/2003 | Noda et al. |

* cited by examiner

*Primary Examiner*—Richard Crispino
*Assistant Examiner*—Christopher Schatz
(74) *Attorney, Agent, or Firm*—Alston & Bird LLP

(57) ABSTRACT

A method for fabricating stringers is provided. The co-cured composite stringer includes a stringer and a mandrel positioned within a channel defined in the stringer. A plurality of strips are positioned within an opening of the mandrel, and a substrate layer, such as aircraft skin, is positioned adjacent to the stringer. During application of the substrate layer to the stringer, the mandrel and plurality of strips support the stringer.

25 Claims, 5 Drawing Sheets

METHOD FOR FABRICATING STRINGERS

CROSS-REFERENCE TO RELATED APPLICATIONS

This application is a divisional of U.S. application Ser. No. 10/830,291, filed Apr. 20, 2004 now U.S. Pat. No. 7,293,737, which is hereby incorporated herein in its entirety by reference.

BACKGROUND OF THE INVENTION

1) Field of the Invention

The present invention relates to stringers and, more particularly, to a collapsible mandrel having reinforcing strips therein that may be employed to co-cure stringers, as well as an associated fabrication method.

2) Description of Related Art

Aircraft utilize a variety of elements for reinforcement due to the application of bending, torsional, shear, and direct loading on the aircraft. One of the basic reinforcing structures used within aircraft include stringers (also termed stiffeners and longerons), which typically run spanwise within the wing. Stringers may be fabricated into various cross sections, such as I-beams, Z, and "hat" sections. Stringers are typically a lightweight composite formed into a tape or fabric, which includes using a plurality of fibers embedded in a matrix of resin or adhesive to support and bond the fibers together (i.e., pre-impregnated or "prepreg"). A lay-up method is typically used to form the stringers, wherein the skin, typically also formed as a prepreg, is applied to a stringer using sufficient head pressure. Autoclaving or a similar method is then used to cure the stringer and the aircraft skin together.

There are a variety of mandrels used to co-cure stringers. For example, there are hollow mandrels that, when vented to an autoclave, press from the inside out. However, the hollow mandrels cannot support the tape head rolling over the stringers. Another type of mandrel includes hard rubber mandrels placed between the skin and stringer, but this mandrel has proved to be difficult to remove from long stringers following curing. There are also expendable mandrels that may be dissolved after curing, but this mandrel requires a messy and impractical dissolution process. Finally, there is a re-usable elastomeric mandrel system (REMS), which is essentially a rubber shaped mandrel full of ceramic beads. In spite of this design, the REMS is impractical to use with longer stringer lengths.

Further, U.S. Pat. No. 5,368,807 to Lindsay discloses a method for vacuum bag molding fiber reinforced resin matrix composites without requiring the use of a mandrel. The method includes laying prepreg stiffener hat sections on the inside portion of a rigid portion of a vacuum bag. An elastomeric tube is inserted within each of the stiffener sections, and may be inflated to conform to the shape of the stiffener. A sealing wedge is placed on the end of each of the stiffeners to hold and seal the elastomeric tube to the rigid portion of the vacuum bag. Following curing, the wedge is removed, and a vacuum drawn on the elastomeric tube is used to collapse the tube for removal from the vacuum bag.

Lindsay shows the stringers or longerons arranged linearly, but does not permit arranging and co-curing the stringers in a variety of other contours, as would be desirable. In addition, the rigid vacuum bag only supports the stringer during autoclaving but does not support the stringer during laying up of the aircraft skin. Thus, the aircraft skin in Lindsay is not capable of being applied over a recessed area of a "hat-shaped" stringer such that the elastomeric tube does not have to withstand the head pressure of tape laying aircraft skin to the stringer, where the head pressure may also cause collapse of the aircraft skin within the recess or of the stringer itself.

It would therefore be advantageous to provide a mandrel used in co-curing stringers that may withstand the pressure applied during lay-up. Also, it would be advantageous to provide a stringer and mandrel that may be formed into various shapes prior to co-curing. Finally, it would be advantageous to provide a mandrel that may be easily removed following co-curing.

BRIEF SUMMARY OF THE INVENTION

The invention addresses the above needs and achieves other advantages by providing a composite stringer that may be supported by a collapsible mandrel during lay-up and co-curing. The composite stringer is fabricated in part with the support of a mandrel and reinforcing strips during application and curing of the substrate layer to the stringer. The mandrel and reinforcing strips may be removed following co-curing of the composite stringer and reused to fabricate additional stringers.

In one embodiment, the co-cured composite stringer includes a stringer and a mandrel positioned within a channel defined in the stringer. A plurality of strips are positioned within an opening of the mandrel, and a substrate layer, such as uncured pre-impregnated skin, is positioned adjacent to the stringer. During application of the substrate layer to the stringer, the mandrel and plurality of strips support the stringer.

In variations of the present invention, the co-cured composite stringer includes a plurality of strips stacked horizontally and vertically within the opening of the mandrel such that each of the strips may slide with respect to one another. The plurality of strips are preferably positioned within the opening of the mandrel such that the strips substantially conform to the shape of the mandrel. In addition, the plurality of strips are pliable such that the mandrel and strips are capable of bending to a desired contour. The plurality of strips may be rectangular in shape and comprise a polymeric material (e.g., nylon). The stringer may be an uncured pre-impregnated reinforcing material, such as an epoxy graphite, while the mandrel may be an elastomeric material. In another advantageous embodiment of the present invention, the mandrel and plurality of strips are capable of withstanding at least 90 psi of head pressure.

In another aspect of the present invention, a collapsible lay-up mandrel assembly is provided that comprises a mandrel defining an opening therethrough, and a plurality of strips slidably positioned within the opening of the mandrel.

The present invention further provides a method of fabricating stringers. The method includes providing a stringer that defines a channel therein. A plurality of strips are positioned within a mandrel, and the mandrel is then positioned within the channel of the stringer. The method also includes applying a substrate layer to the stringer. The mandrel and plurality of strips are capable of supporting the stringer during application of the substrate layer, which may include head pressures of at least 90 psi. Finally, the stringer and the substrate layer are attached to one another, such as by curing the stringer and substrate layer together.

In additional embodiments of the present invention, the method further includes bending the plurality of strips and mandrel to a desired contour. The plurality of strips may also be slid from the mandrel following application of the substrate layer. Applying a vacuum to the mandrel following removal of the plurality of strips may be employed to remove the mandrel.

The present invention therefore provides a co-cured composite stringer that may be formed into a variety of contours and lengths. An uncured substrate layer is applied to an uncured stringer such that the substrate layer may be co-cured to the stringer. The mandrel and strips are used to retain a desired shape of the stringer during laying of the substrate layer to the stringer and during co-curing. In addition, the mandrel and strips may be manipulated to various configurations prior to application of the substrate layer, and may be removed and reused following co-curing. A variety of materials may be used for individual elements in embodiments of the present invention to fabricate co-cured stringers that provide various degrees of reinforcement to the substrate layer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
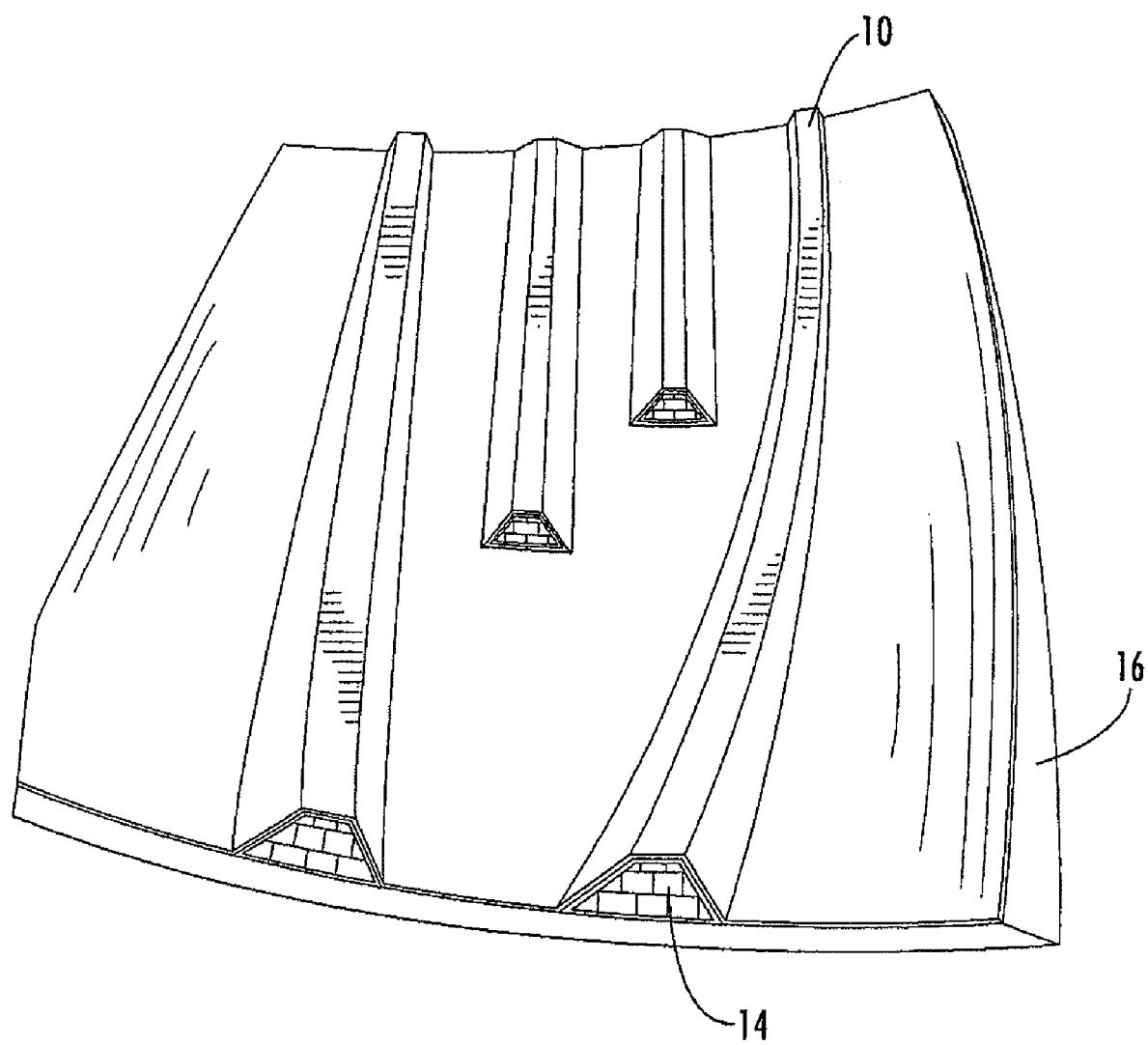
FIG. 1 is a perspective view of a plurality of co-cured stringers having strips positioned within a respective mandrel according to one embodiment of the present invention.

Referring now to the drawings and, in particular to FIG. 1, there is shown a substrate 16 having a plurality of stringers 10 arranged thereon. The stringers 10 are capable of being arranged in a variety of positions, for example, longitudinally along the span of an aircraft wing or contoured to a specific curvature. Additionally, the stringers 10 could be any number of dimensions to accommodate a variety of reinforcement applications. The term "stringer" is not meant to be limiting and could be any stiffener, longeron, or reinforcing member that is used to provide support to another structure, such as an aircraft skin. Furthermore, the stringers 10 could be useful to support structures other than aircraft skins or wings, such as with marine, construction, or automotive structures, where a lightweight reinforcement is desired. Thus, the substrate 16 could be any suitable material that that is capable of being reinforced by the stringers 10. For purposes of example, however, reference will be made to an aircraft skin as the substrate 16.

Figure 2:
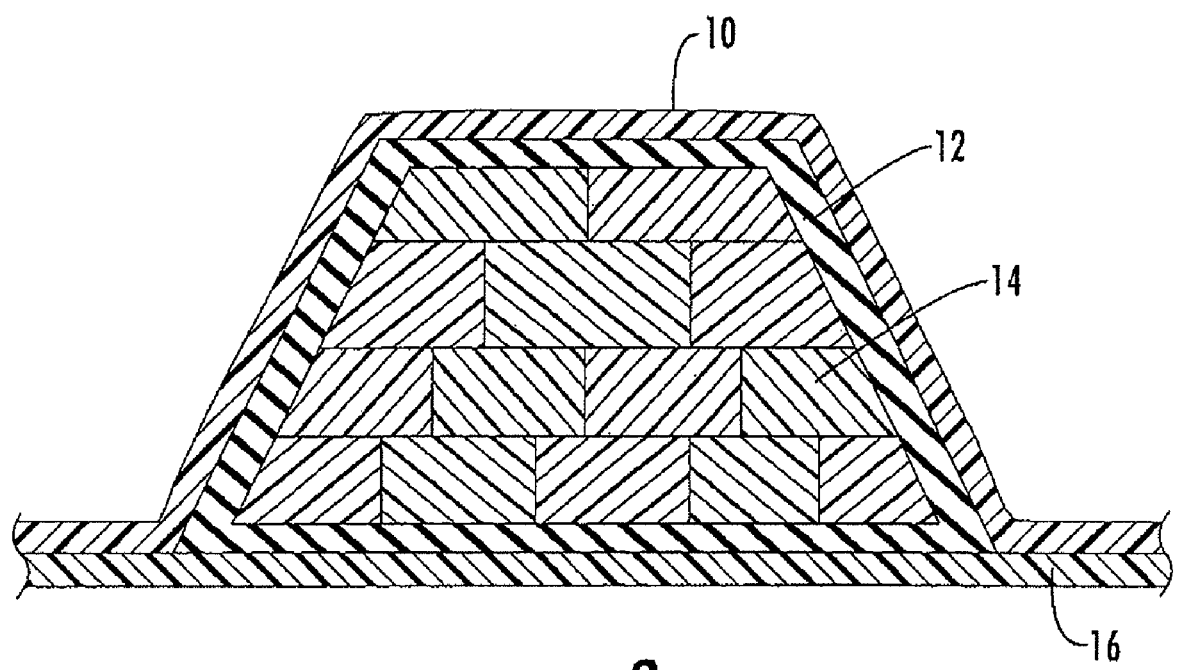
FIG. 2 is an enlarged cross-sectional view of one of the co-cured stringers shown in FIG. 1.

The stringers 10 are generally fabricated by applying an aircraft skin 16 to the stringer and co-curing the aircraft skin and underlying stringer together. In order to ensure that the stringer 10 maintains its shape during laying of the aircraft skin 16, a mandrel 12 is positioned between the stringer and the aircraft skin. In addition, a number of strips 14 are positioned within the mandrel 12 to also provide reinforcement during lay-up of the aircraft skin 16. The stringers 10 shown in FIGS. 1-2 are "hat" shaped as known to those skilled in the art, although various shapes could be used in additional embodiments of the present invention, such that various mandrel 12 shapes could also be utilized.

The composite material used for each of the stringers 10 and aircraft skin 16 is generally a lightweight material, such as an uncured pre-impregnated reinforcing tape or fabric (i.e., "prepreg"). The tape or fabric typically includes a plurality of fibers such as graphite fibers that are embedded within a matrix material, such as a polymer, e.g., an epoxy or phenolic. The tape or fabric could be unidirectional or woven depending on the degree of reinforcement desired. Thus, the prepreg tape or fabric is generally laid onto a mandrel or mold to preform the tape or fabric into the desired shape of the stringer 10 as defined by the mandrel or mold. The stringers 10 could be any suitable dimension to provide various degrees of reinforcement, and could be comprised of any number of plies of prepreg tape or fabric. Similarly, the aircraft skin 16 could be various sizes and thicknesses for both individual and multiple plies depending on the weight and amount of support desired.

In one embodiment, each stringer 10 is preformed and generally defines a channel or recess. Further, each preformed stringer 10 is typically uncured. A mandrel 12 is positioned within the channel of the stringer 10. The mandrel 12 has a shape that substantially conforms to the corresponding channel defined by the stringer 10 such that the mandrel may provide support to the stringer during subsequent lay up of the aircraft skin 16. Also, the mandrel 12 defines an opening, such as a lengthwise opening, such that a plurality of longitudinally extending strips 14 may be inserted within the opening to provide reinforcement to the mandrel.

The mandrel 12 of the illustrated embodiment has a trapezoidal shape to conform to a hat-shaped stringer 10, although the mandrel could have any number of other shapes to conform to differently shaped stringers. Similarly, the mandrel 12 could be various dimensions so long as the mandrel defines an opening that enables strips 14 to be inserted therethrough. The mandrel 12 may be formed of any elastomeric material, such as Teflon® (E.I. du Pont de Nemours and Company) coated silicone or hard rubber, but is preferably pliable to enable the mandrel to conform to various configurations. Thus, the mandrel 12 may be bent somewhat to fit within and conform with channels defined by a preformed stringer 10 that may not be linear, such as curved or piecewise linear channels. In addition, the mandrel 12 may be fabricated with any suitable technique, such as with extrusion or casting.

As shown in FIG. 2, the strips 14 are inserted within the opening defined in the mandrel 12. The strips 14 are advantageously pliable and may slide with respect to one another. Because the strips 14 are pliable and individually capable of sliding axially within the mandrel 12, the strips can have a variety of cross-sectional shapes, as shown in FIG. 1. The greater the number of strips 14, i.e., smaller cross section, the more flexible the mandrel 12 is, such that more complex contours may be achieved with a greater number of strips. The collection of strips 14 substantially conform to the shape of the opening defined by the mandrel 12 such that there are no gaps between the strips and the mandrel. FIG. 2 demonstrates that the strips 14 may be arranged horizontally and vertically with respect to one another, as well as adjacent to each other, although the strips could be arranged in any number of configurations within the mandrel 12. Furthermore, although some of the strips 14 are shown as being rectangular, the strips could be any number of dimensions and cross-sectional shapes that may complement the shape of the opening defined by the mandrel 12, as well as any number of lengths depending on the structure to be reinforced.

In the embodiment of the present invention shown in FIG. 2, there are outer strips 14 that contact the surface of the mandrel 12, while interior strips contact other adjacent strips but do not contact any surface of the mandrel. The widest strips 14 in the mandrel 12, the top two strips shown in FIG. 2, are generally split into two separate strips to aid in the removal of the strips from the mandrel following curing. However it is understood that the strips 14 shown in FIG. 2 could be arranged within the mandrel 12 in any desired configuration with any number and dimension of strips. The interior strips 14 are generally easier to remove and are thus removed first, although the strips could be removed in any order desired.

The strips 14 are preferably a polymeric material, such as nylon that is capable of withstanding the temperatures associated with co-curing. However, the material used for the strips 14 depends on the temperature used in co-curing to prevent deformation of the strips by heating the strips above their melting temperature, as well as the configuration of the strips arranged within the mandrel 12, such that various materials could be used in variations of the present invention in additional embodiments. The strips 14 may have a coefficient of thermal expansion that is higher than the surrounding stringer 10 and aircraft skin 16 such that the strips expand when heated to apply additional pressure during curing, but also contract upon cooling to aid in removal of the strips from the mandrel 12. The strips 14 could be fabricated through extrusion, molding, or any other suitable process.

Figure 5:
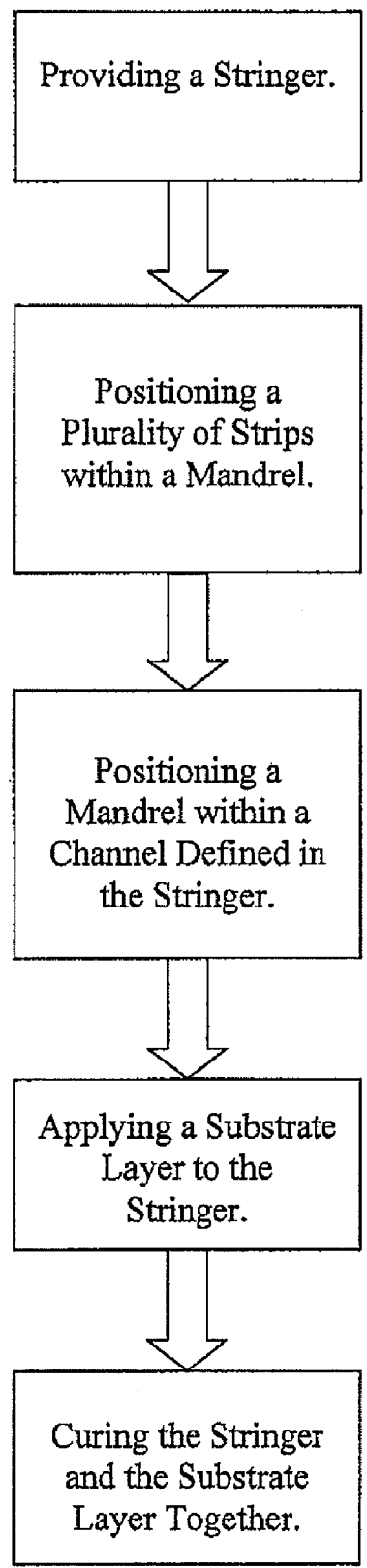
FIG. 5 shows a flowchart of a method of fabricating co-cured stringers according to one embodiment of the present invention.

A method of fabricating co-cured stringers 10 is illustrated in the flowchart shown in FIG. 5. After each of the stringers 10 is preformed in an uncured state, the stringers are typically first placed in a trough section of a lay-up mandrel that defines a shape corresponding to that of the preformed stringers. The stringers 10 are uncured so that the prepreg may be cured at the same time that the stringer is cured to the aircraft skin 16. Next, the mandrel 12, having the strips 14 inserted within the mandrel as described above, is placed within a respective channel or recess defined by the stringers 10. The strips 14 could also be inserted within the mandrel 14 after the mandrel is positioned in the channel or recess of the stringer 10, as opposed to already being assembled within the mandrel. As a result of their pliability, the mandrel 12 and strips 14 could be bent or otherwise arranged within the channel or recess of the stringer 10 in any number of configurations, such that the mandrel and strips need not be custom-made for a particular stringer shape or contour.

The aircraft skin 16 is generally applied over the mandrel 12 and exposed portions of the stringer 10 with pressure being applied, such as a head pressure of about 90 psi. The mandrel 12 and strips 14 are capable of withstanding this head pressure to ensure that the aircraft skin 16 and stringer 10 maintain their shape and are not undesirably deformed. The aircraft skin 16 is applied as a tape or fabric such that a sufficient amount of tape or fabric of the aircraft skin contacts the stringer 10 to allow the stringer to cure to the aircraft skin 16 during autoclaving. Laying the aircraft skin 16 onto the stringer 10 and mandrel 12 is preferably automated, although it is understood that hand-laying techniques could also be employed in alternative embodiments of the present invention. It is also understood that additional techniques, as known to those skilled in the art, could be utilized in applying the aircraft skin 16 to the stringer 10. In this regard, in one alternative of the present invention, the mandrel 12 could be placed on the aircraft skin 16 and prepreg applied over the mandrel such that the stringer could be formed over the mandrel and applied directly to the aircraft skin.

The stringer 10 and aircraft skin 16 are generally co-cured with autoclaving, as known to those skilled in the art, which generally involves the application of heat and pressure under vacuum. It is understood that other techniques could be used to co-cure the stringer 11 and the aircraft skin 16, such as with a vacuum bag, as known to those skilled in the art.

Figure 3:
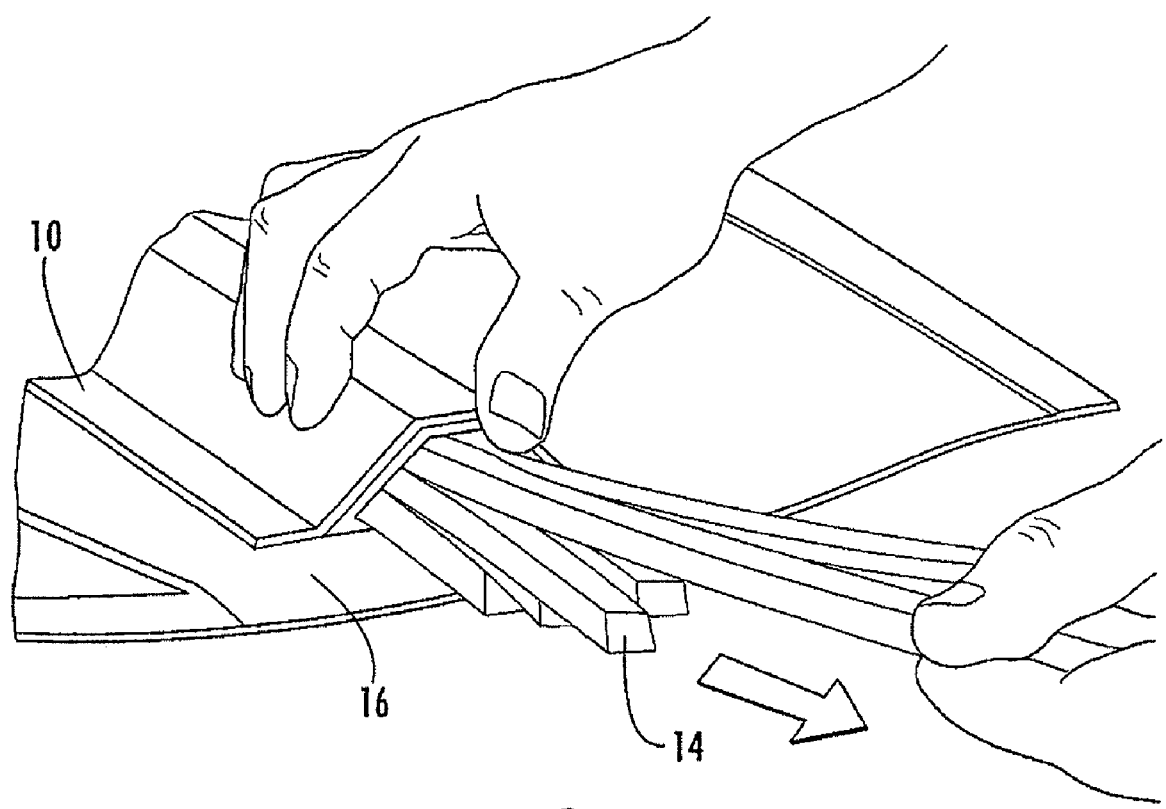
FIG. 3 is a perspective view of a stringer illustrating that each strip is removable from the mandrel of one embodiment of the present invention.
Figure 4:
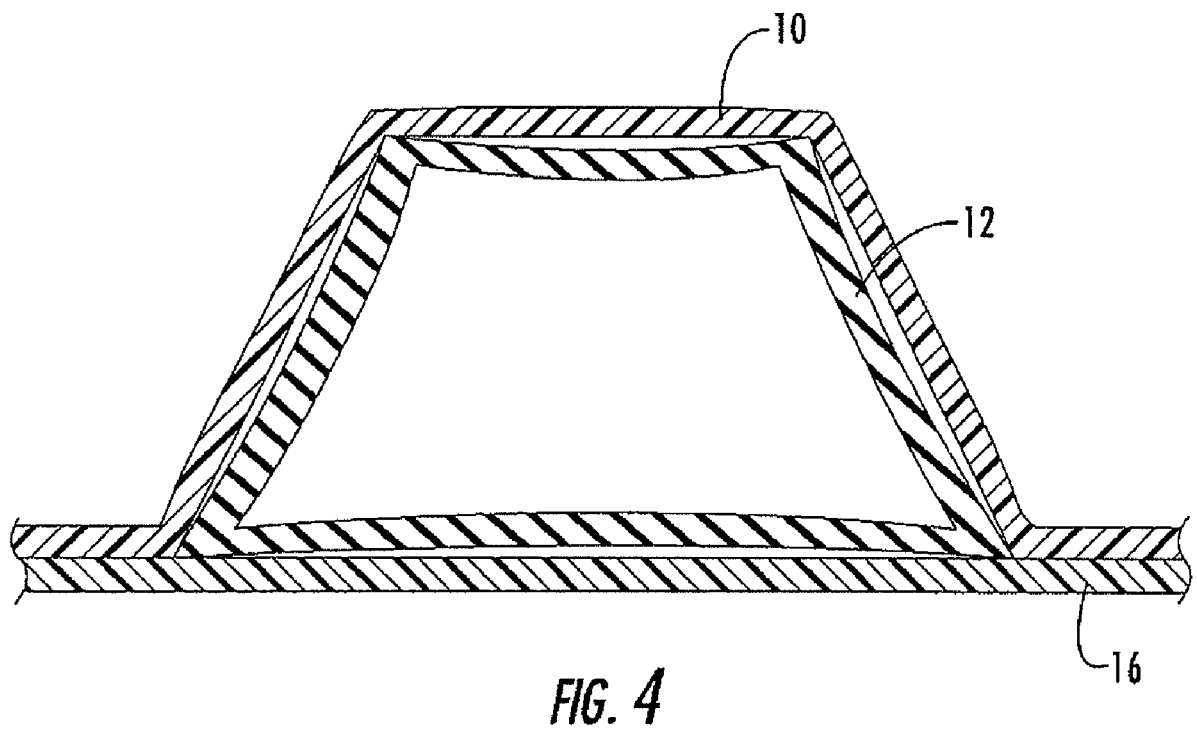
FIG. 4 is an enlarged cross-sectional view of a stringer with the strips removed and vacuum applied to the mandrel of one embodiment of the present invention.

Following co-curing of the stringer 10 and the aircraft skin 16, each of the strips 14 may be removed, as illustrated in FIG. 3. Thus, the strips 14 are capable of being removed individually by hand. As discussed above, the strips 14 that do not contact any surface of the mandrel 12 are typically removed first. After each of the strips 14 have been removed from the mandrel 12, the mandrel is subjected to a vacuum to collapse it slightly so that the mandrel can be removed from each of the stringers 10. The mandrel 12 is also capable of being removed from the co-cured stringer 10 by hand without the application of a vacuum. FIG. 4 illustrates a cross section of a mandrel under vacuum, which demonstrates that the edges buckle slightly to enable easy removal of the mandrel. Each of the strips 14 and mandrel 12 may thus be reused during subsequent co-curing of additional stringers 10. Although FIG. 3 illustrates the strips 14 capable of being removed by hand, it is understood that other techniques of removing both the strips and the mandrel could be employed, such as with an automated machine.

In alternative embodiments of the present invention, the stringer 10 could be pre-cured prior to being cured to the aircraft skin 16, or vice versa. In addition, both the stringer 10 and aircraft skin 16 could be pre-cured and attached together. Furthermore, it is understood that the stringers 10 could be shaped in a lay-up mandrel rather than being in an uncured and preformed shape such that the stringer is molded into a hat section in the same lay-up mandrel that laying up of the aircraft skin takes place. Also, it is understood that the aircraft skin 16 could be laid over the "hat-shaped" side of the stringer 10 (i.e., the side opposite to the channel or recess) in addition to over the channel or recess and co-cured to the stringer such that the aircraft skin is co-cured to both sides of the stringer. Alternatively, the aircraft skin 16 could be laid over the "hat-shaped" side of the stringer 10 only and subsequently co-cured to the stringer. Thus, the mandrel 12 and strips 14 would support the stringer 10 if the aircraft skin is applied in either manner.

Therefore, the combination of the mandrel 12 and strips 14 provide reinforcement during application of the aircraft skin 16 and autoclaving. Thus, the mandrel 12 and strips 14 prevent the stringers 10 from buckling when the aircraft skin 16 is laid over the recessed area of the stringers. The stringers 10 may be fabricated in any number of dimensions depending on the type of support and configuration desired. In addition, the mandrel 12 and strips 14 may be advantageously bonded to the aircraft skin 16 in one autoclave cure cycle and removed following co-curing and reused for additional curing.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are That which is claimed:

1. A method for fabricating co-cured stringers comprising:
providing a stringer, the stringer defining a channel therein;
positioning a plurality of strips within a mandrel such that a plurality of rows of strips are stacked on top of one another, wherein each row comprises a plurality of strips and each of the strips is configured to slide with respect to one another;
positioning the mandrel within the channel defined in the stringer;
applying a substrate layer to the stringer, wherein the mandrel and plurality of strips support the stringer during the applying of the substrate layer; and
curing the stringer and the substrate layer such that the stringer and substrate layer are attached.

2. The method according to claim 1, further comprising bending the plurality of strips and mandrel to a desired contour.

3. The method according to claim 1, wherein applying comprises applying uncured pre-impregnated reinforcing material.

4. The method according to claim 1, further comprising removing the plurality of strips by sliding the strips from the mandrel following curing.

5. The method according to claim 4, further comprising applying a vacuum to the mandrel following removing the plurality of strips.

6. The method according to claim 5, further comprising removing the mandrel following applying the vacuum.

7. The method according to claim 1, wherein positioning comprises sliding the plurality of strips within the mandrel.

8. A method for fabricating stringers comprising:
providing a stringer, the stringer defining a channel therein;
sliding a plurality of strips within a mandrel such that a plurality of rows of strips are stacked on top of one another, wherein each row comprises a plurality of strips and each of the strips is configured to slide with respect to one another;
positioning the mandrel within the channel defined in the stringer;
applying a substrate layer to the stringer, wherein the mandrel and plurality of strips support the stringer during the applying of the substrate layer; and
attaching the stringer and the substrate layer together.

9. The method according to claim 8, wherein attaching comprises curing the stringer and the substrate layer such that the stringer and substrate layer are attached.

10. The method according to claim 8, further comprising bending the plurality of strips and mandrel to a desired contour.

11. The method according to claim 8, wherein applying comprises applying the substrate layer at a head pressure of at least 90 psi.

12. The method according to claim 11, further comprising removing the plurality of strips by sliding the strips from the mandrel following attaching the stringer and the substrate layer together.

13. The method according to claim 12, further comprising applying a vacuum to the mandrel following removing the plurality of strips.

14. The method according to claim 13, further comprising removing the mandrel following applying the vacuum.

15. A method for fabricating stringers comprising:
providing a stringer, the stringer defining a channel therein;
positioning a plurality of strips within a mandrel such that a plurality of rows of strips are stacked on top of one another, wherein each row comprises a plurality of strips and each of the strips is configured to slide with respect to one another;
positioning the mandrel within the channel defined in the stringer;
applying an aircraft skin to the stringer, wherein the mandrel and plurality of strips support the stringer during the applying of the aircraft skin; and
attaching the stringer and the aircraft skin together.

16. The method according to claim 15, wherein attaching comprises curing the stringer and the aircraft skin such that the stringer and aircraft skin are attached.

17. The method according to claim 15, further comprising bending the plurality of strips and mandrel to a desired contour.

18. The method according to claim 15, wherein applying comprises applying uncured pre-impregnated reinforcing material.

19. The method according to claim 15, further comprising removing the plurality of strips by sliding the strips from the mandrel following attaching.

20. The method according to claim 15, wherein positioning comprises sliding the plurality of strips within the mandrel.

21. The method according to claim 5, wherein applying a vacuum comprises applying a vacuum to the mandrel such that the mandrel returns to its original shape upon removal of the vacuum.

22. The method according to claim 1, wherein positioning comprises positioning a plurality of strips within a mandrel such that the strips are arranged in a plurality of horizontal rows stacked vertically on top of one another.

23. The method of according to claim 1, wherein applying comprises laying up the substrate layer onto the stringer while applying pressure.

24. The method according to claim 1, wherein positioning comprises positioning the plurality of strips within the mandrel such that a plurality of outer strips are positioned in contact with the mandrel and at least one inner strip does not contact any surface of the mandrel.

25. The method according to claim 1, wherein positioning comprises positioning the plurality of strips within a longitudinal opening defined in the mandrel such that the plurality of strips substantially fill and conform to the longitudinal opening.

* * * * *